May 22, 1928.                                                       1,670,654
J. DELANEY
SEPARABLE FASTENER
Filed Nov. 15, 1927
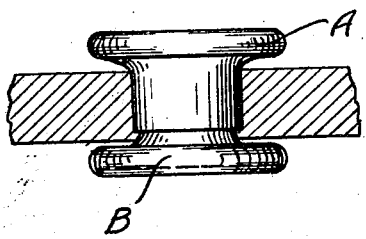
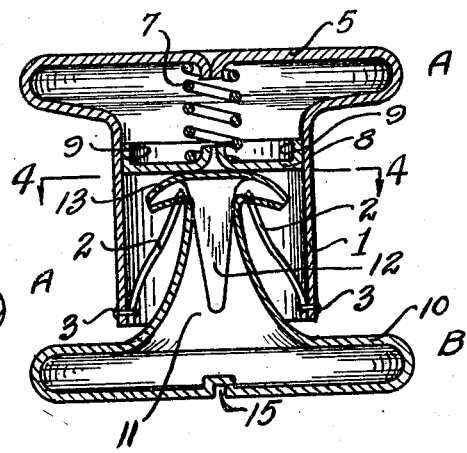
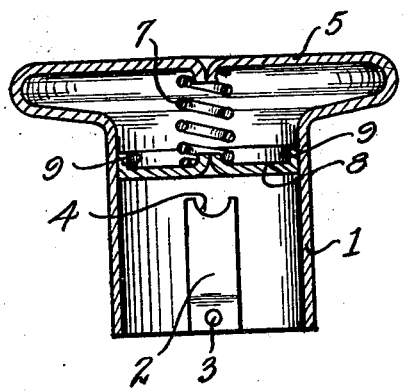
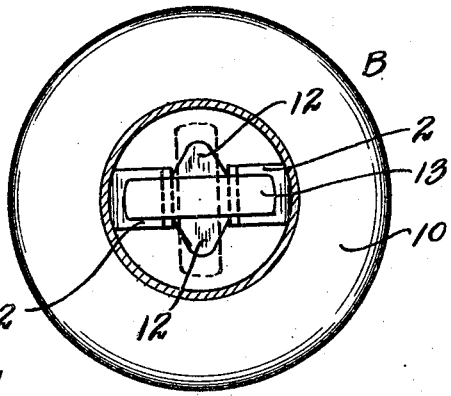
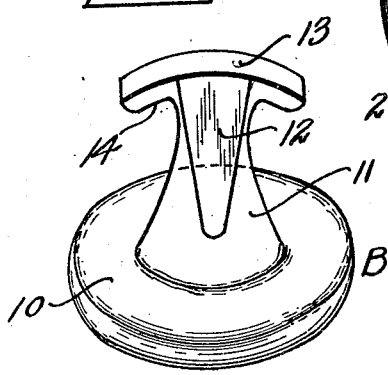
Inventor
James Delaney
By Herbert E. Smith
Attorney Patented May 22, 1928.

1,670,654

UNITED STATES PATENT OFFICE.

JAMES DELANEY, OF COEUR D'ALENE, IDAHO.

SEPARABLE FASTENER.

Application filed November 15, 1927. Serial No. 233,386.

My present invention relates to an improved separable fastener of the head and socket type wherein the socket is provided with resilient means and the head is rigid and rotatable within the socket, as for instance a quarter turn, to lock and unlock the head in the socket.

The device of my invention is adapted for use as a snap button, for use on clothing and apparel, as for instance as a collar button, or as a cuff button. The separable fastener is also adapted for use as a fraternal button to be used upon the lapel of the coat, for filing papers, in connection with loose leaf ledgers, and in various other ways.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a view showing the separable fastener in use;

Fig. 2 is an enlarged sectional view of the fastener with the head and socket locked together;

Fig. 3 is a sectional view of the socket member;

Fig. 4 is a transverse sectional view of the socket member showing also the head, as at line 4—4 of Fig. 2; and Fig. 5 is a perspective view of the head.

In order that the general arrangement of parts may readily be understood, I have designated the socket as A and the head as B, the former being a resilient socket and the latter a rigid head which is adapted to be slipped into the socket and given a quarter turn for locking.

The resilient socket comprises a sleeve 1 which as shown may be cylindrical and is provided on its interior with two diametrically arranged spring plates 2, 2 which are attached near the open end of the sleeve by rivets 3 to the sleeve. The free ends of these spring plates that extend within the socket are notched as at 4 for a purpose to be described. The socket member has an enlarged hollow circular base 5 and this base has an interior central boss 6 fashioned integral therewith which is designed to guide a spring 7 that is interposed between the boss and a slide disk 8. The disk 8 is circular and fits neatly within the cylindrical sleeve 1 and is provided with an annular guide flange 9. It will be apparent that the slide disk 8 may be moved longitudinally of the sleeve against the tension of the spring 7, and the slide disk may have a reciprocable movement in the sleeve.

The rigid head which is used in connection with the resilient socket has a circular disk 10 about the size of the base 5 of the socket and this disk 10 is provided with an integral tapering shank 11 having two opposed flat faces 12 which provide for a wedge action of the tapering shank. On the end of the tapering shank, that is at its smaller end, is provided a T-head 13. The inner faces of the extensions of the T-head are convexed as at 14 to conform to the notches 4 in the spring plates 2. The exterior face of the disk 10 may be provided with a kerf 15 for the reception of a screw driver.

From this description it will be apparent that the head is slipped into the socket with the two wedge faces 12 sliding in contact with the free ends of the spring plates 2. The T-head engages the slide disk 8 and pushes said disk to compress the spring 7. After the head has been pushed a sufficient distance into the socket the head is given a quarter turn, or a turn through 90° to disengage the flat faces 12 from the spring plates 2 and bring the T-head in alinement with the two spring plates so that the convex faces 14 of the T-head will engage the notches 4 of the spring plates 2. Then when the disk 10 is released the spring 7 by bearing against the disk 8, which disk is in contact with the T-head 13, holds the convex faces 14 of the head in the notches 4 of the spring plates, thereby preventing disengagement of the head from the socket. To release the parts, the head and socket are held in the hands and a quarter turn is given to one or the other for the purpose of releasing the head from the socket.

Having thus fully described my invention, what I claim as new and desire to secure by Letters Patent is—

1. In a separable fastener the combination with a socket having a spring pressed slide disk therein, a pair of opposed spring plates secured within the socket and provided with notched ends adjacent the disk, of a separable head having retaining means for coaction with and between said notched ends and said slide disk.

2. The combination with a socket having a spring pressed slidable disk, and a pair of opposed spring plates having notches in their free ends, of a head comprising a tapering shank having opposed flat sides, a T-head on said shank, and said T-head having concave faces for engagement with the notched ends of the spring plates.

In testimony whereof I affix my signature.

JAMES DELANEY.